Patented Nov. 3, 1953

2,658,048

UNITED STATES PATENT OFFICE 2,658,048

PLASTIC COMPOSITIONS AND ARTICLES PRODUCED THEREFROM

Ralph J. Signer, Villa Park, Ill., assignor to The Visking Corporation, Chicago, Ill., a corporation of Virginia No Drawing. Application October 10, 1951, Serial No. 250,810

16 Claims. (Cl. 260—32.8)

This invention relates to plastic compositions and articles produced therefrom. More particularly, it relates to a composition comprising a halogen-containing resin and films produced therefrom.

Film formed of a composition comprising halogen-containing vinyl resin and nitrile rubber possesses many desirable properties which make it admirably suitable for use in the wrapping and packaging field, as well as in the production of laminated materials wherein it constitutes one or more of the plies thereof. In addition to being tough and having relatively high tensile strength, such film has a low permeability to moisture, oxygen and carbon dioxide. It has the ability to cling to irregular shapes, giving close adherence and eliminating air pockets. The film contains no migrating plasticizer and thus retains its flexibility and toughness for relatively long periods of time. It is transparent and is capable of being heat sealed. When used in the wrapping and packaging of foods it will not contaminate the foods. It transmits no odors or off-tastes to food and such products as meat, cheese, margarine and pickles do not affect the film adversely on storage.

The aforementioned film, however, has a tendency to stick to itself during the process of making the same or block subsequently thereto.

The term "block" or equivalent terminology used herein is intended to define the property that a plastic structure has of sticking or adhering to itself or like structures when tested by the Quartermaster Corps Tentative Specification P. Q. D. No. 377, Test F-3d, as of June 4, 1943. According to this test, a sample of the vinyl resin structure, such as, for example, a sample of film 6" x 18", is double-folded to a 6" x 6" size, face to face and back to back, and placed between two glass plates. This assembly is subjected to 150° F. and ⅓ pound per square inch pressure for 48 hours, and thereafter cooled at a temperature of 70° F. and 65% relative humidity. The sample is then inspected for ease or difficulty of separating the film according to a scale of 1 to 5 as follows:

1. No blocking; sheets free.
2. No blocking; sheets adhere slightly.
3. Slight blocking; sheets must be peeled to separate.
4. Blocking; sheets separate with difficulty.
5. Blocking; sheets cannot be separated intact.

A rating of 1 or 2 designates a satisfactory material.

An object of this invention is to provide a composition of matter comprising a halogen-containing vinyl resin for producing shaped structures substantially free of the tendency to block.

Another object of this invention is to provide a shaped structure substantially free of the tendency to block and comprising a halogen-containing vinyl resin.

A specific object of this invention is to provide a halogen-containing vinyl resin film substantially free of the tendency to block.

Other and additional objects will become apparent hereinafter.

The objects of this invention are, in general, accomplished by incorporating stearone (distearyl ketone) in halogen-containing vinyl resin-nitrile rubber compositions and melt extruding the composition to produce the desired shaped structure.

Stearone, though primarily intended to provide anti-blocking characteristics in the shaped structure, also acts as a lubricant during the extruding operation and does not deleteriously affect the other desirable properties of the product.

The halogen-containing vinyl resin can be vinyl chloride, vinyl fluoride or vinyl bromide polymerized alone or conjointly with a minor proportion of vinyl acetate, vinyl propionate, vinyl butyrate, vinyl benzoate, vinyl cyanide, vinylidene chloride styrene, alkyl chloride, ethyl acrylate, methyl acrylate, methyl methacrylate or the like. If desired, a mixture of halogen-containing vinyl resins may be used. Particularly suitable are polyvinyl chloride and the halogen-containing vinyl resins resulting from the conjoint polymerization of vinyl chloride and vinyl acetate in the proportions of from about 60% to 97% vinyl chloride with correspondingly about 40% to 3% of vinyl acetate.

The composition, in its preferred embodiment, contains nitrile rubber, i. e., synthetic rubber produced by the copolymerization of acrylonitrile and/or methacrylonitrile and 1,3 butadiene. Such nitrile rubber may be prepared by any of the known methods of preparing copolymers, although it has been found that copolymers produced by emulsion polymerization gives best results. Preferably, the nitrile rubber contains from about 40% to 75% by weight of butadiene 1,3 and correspondingly 60% to 25% by weight of acrylonitrile. If desired, a plurality of nitrile rubbers of different acrylic nitrile content may be used.

In general, the halogen-containing vinyl resin is present in the composition in an amount at least equal to and preferably greater than that of the nitrile rubber. Satisfactory results have been obtained when the composition contains 60 parts by weight of halogen-containing vinyl resin and 40 parts by weight of nitrile rubber.

The quantity of stearone incorporated in the composition which gives optimum results is from 1½% to 4% by weight, based on the combined quantities of halogen-containing vinyl resin and nitrile rubber in the composition. Less than 1½% of stearone based on the combined quantities of halogen-containing vinyl resin and nitrile rubber will give very slight improvement in antiblocking. When the percentage of stearone exceeds 4%, the composition becomes over-lubricated and is difficult, if not impossible, to melt extrude. In the preferred embodiment, 2½% of stearone, based on the combined quantities of the halogen-containing vinyl resin and nitrile rubber in the composition, is used.

The components of the composition may be compounded by milling in a plastic or rubber mill. Mixing is facilitated through the use of a warm mill. If desired, stabilizers for halogen-containing vinyl resin and nitrile rubber may be incorporated in the composition during the milling operation. Likewise, if desired, vulcanizing ingredients which are ordinarily used in compounding rubber or synthetic rubber may also be incorporated. When a colored product is desired, an appropriate dye or pigment can likewise be incorporated.

The composition can be used for the production of any shaped article requiring antiblocking characteristics. It is admirably suited for the production of self-sustaining film either in the form of lay-flat seamless tubing or web (single thickness of film) of both indefinite and definite lengths. The wall thickness of the seamless tubing and the thickness of the web can be between approximately 0.3 mil to 6 mils or higher.

In the preferred form of the invention, seamless lay-flat tubing is obtained by hot-melt extruding the composition by the tubular expansion process of U. S. Patent No. 2,461,975. When single thickness film is desired, the tubing produced by the previously mentioned method may be longitudinally slit or the composition may be calendered or melt extruded through a slot.

The following example is an illustrative embodiment of the composition, the proportions being parts by weight:

| | |
|---|---|
| Polyvinyl chloride | 60.0 |
| Nitrile rubber (30%–45% acrylonitrile and correspondingly 70%–55% butadiene 1,3) | 40.0 |
| Stearone | 2.5 |
| Stabilizer for polyvinyl chloride (sodium sorbate) | 0.4 |
| Stabilizer for nitrile rubber (heptalated diphenyl amine) | 2.0 |

The composition of the example was extruded by the hot melt process of U. S. Patent No. 2,461,975 to produce thin, flexible self-sustaining film in the form of lay-flat seamless tubing having a wall thickness of at least 0.3 mil. Such film, in addition to possessing the characteristics herein previously mentioned, had a rating of 2 or better when tested by the blocking test hereinbefore described.

This invention provides halogen-containing vinyl resin-nitrile rubber composition which, when melt-extruded, provides a product which is substantially free of the tendency to block. Film produced in accordance with this invention can be used for many diverse purposes. It can be used for wrapping and packaging purposes generally and particularly for foods such as meat, cheese, margarine, etc. It can be used in the production of laminated materials and may constitute one or more plies thereof.

Since it is obvious that many changes and modifications can be made in the above-described details without departing from the nature and spirit of the invention, it is to be understood that the invention is not to be limited thereto except as set forth in the appended claims.

I claim:

1. A composition for producing, by hot-melt extrusion, articles substantially free of the tendency to block and comprising halogen-containing vinyl resin, nitrile rubber in an amount not more than said vinyl resin, said nitrile rubber being formed of 40% to 75% of butadiene 1,3 and correspondingly 60% to 25% of acrylonitrile, and an antiblocking agent which also acts as a lubricant during the melt extrusion operation consisting of stearone in an amount equal to 1½% to 4% by weight of the combined amounts of said vinyl resin and nitrile rubber, said composition being free of volatile solvents.

2. A composition as set forth in claim 1 wherein polyvinyl chloride constitutes the halogen-containing vinyl resin.

3. A composition for producing, by hot-melt extrusion, articles substantially free of the tendency to block and comprising halogen-containing vinyl resin, nitrile rubber in an amount less than said vinyl resin, said nitrile rubber being formed of 40% to 75% of butadiene 1,3 and correspondingly 60% to 25% of acrylonitrile, and an antiblocking agent which also acts as a lubricant during the melt extrusion operation consisting of stearone in an amount equal to 1½% to 4% by weight of the combined amounts of said vinyl resin and nitrile rubber, said composition being free of volatile solvents.

4. A composition for producing, by hot-melt extrusion, articles substantially free of the tendency to block and comprising halogen-containing vinyl resin, nitrile rubber in an amount not more than said vinyl resin, said nitrile rubber being formed of 40% to 75% of butadiene 1,3 and correspondingly 60% to 25% of acrylonitrile, and an antiblocking agent which also acts as a lubricant during the melt extrusion operation consisting of stearone in an amount equal to 2½% by weight of the combined amounts of said vinyl resin and nitrile rubber, said composition being free of volatile solvents.

5. A composition as set forth in claim 4 wherein polyvinyl chloride constitutes the halogen-containing vinyl resin.

6. A composition for producing, by hot-melt extrusion, articles substantially free of the tendency to block and comprising halogen-containing vinyl resin, nitrile rubber in an amount less than said vinyl resin, said nitrile rubber being formed of 40% to 75% of butadiene 1,3 and correspondingly 60% to 25% of acrylonitrile, and an antiblocking agent which also acts as a lubricant during the melt extrusion operation consisting of stearone in an amount equal to 2½% by weight of the combined amounts of said vinyl resin and nitrile rubber, said composition being free of volatile solvents.

7. A composition for producing, by hot-melt extrusion, articles substantially free of the tendency to block and comprising 60 parts of halogen-containing vinyl resin, 40 parts of nitrile rubber, said nitrile rubber being formed of 40% to 75% of butadiene 1,3 and correspondingly 60% to 25% of acrylonitrile, and an antiblocking agent which also acts as a lubricant during the melt extrusion operation consisting of 2.5 parts of stearone, the proportions being by weight, said composition being free of volatile solvents.

8. A composition for producing, by hot-melt extrusion, articles substantially free of the tendency to block and comprising 60 parts polyvinyl chloride, 40 parts of nitrile rubber formed of 30% to 45% acrylonitrile and correspondingly 70% to 55% of butadiene 1,3, and an antiblocking agent which also acts as a lubricant during the melt extrusion operation consisting of 2½ parts of stearone, the proportions being by weight, said composition being free of volatile solvents.

9. Film substantially free of the tendency to block and formed of the composition comprising halogen-containing vinyl resin, nitrile rubber in an amount not more than said vinyl resin, said nitrile rubber being formed of 40% to 75% of butadiene 1,3 and correspondingly 60% to 25% of acrylonitrile, and an antiblocking agent consisting of stearone in an amount equal to 1½% to 4% by weight of the combined amounts of said vinyl resin and nitrile rubber.

10. Film substantially free of the tendency to block and formed of the composition comprising polyvinyl chloride, nitrile rubber in an amount not more than said vinyl resin, said nitrile rubber being formed of 40% to 75% of butadiene 1,3 and correspondingly 60% to 25% of acrylonitrile, and an antiblocking agent consisting of stearone in an amount equal to 1½% to 4% by weight of the combined amounts of said polyvinyl chloride and nitrile rubber.

11. Film substantially free of the tendency to block and formed of the composition comprising halogen-containing vinyl resin, nitrile rubber in an amount less than said vinyl resin, said nitrile rubber being formed of 40% to 75% of butadiene 1,3 and correspondingly 60% to 25% of acrylonitrile, and an antiblocking agent consisting of stearone in an amount equal to 1½% to 4% by weight of the combined amounts of said vinyl resin and nitrile rubber.

12. Film substantially free of the tendency to block and formed of the composition comprising halogen-containing vinyl resin, nitrile rubber in an amount not more than said vinyl resin, said nitrile rubber being formed of 40% to 75% of butadiene 1,3 and correspondingly 60% to 25% of acrylonitrile, and an antiblocking agent consisting of stearone in an amount equal to 2½% by weight of the combined amounts of said polyvinyl chloride and nitrile rubber.

13. Film substantially free of the tendency to block and formed of the composition comprising polyvinyl chloride, nitrile rubber in an amount not more than said vinyl resin, said nitrile rubber being formed of 40% to 75% of butadiene 1,3 and correspondingly 60% to 25% of acrylonitrile, and an antiblocking agent consisting of stearone in an amount equal to 2½% by weight of the combined amounts of said vinyl resin and nitrile rubber.

14. Film substantially free of the tendency to block and formed of the composition comprising halogen-containing vinyl resin, nitrile rubber in an amount less than said vinyl resin, said nitrile rubber being formed of 40% to 75% of butadiene 1,3 and correspondingly 60% to 25% of acrylonitrile, and an antiblocking agent consisting of stearone in an amount equal to 2½% by weight of the combined amounts of said vinyl resin and nitrile rubber.

15. Film substantially free of the tendency to block and formed of the composition comprising 60 parts of halogen-containing vinyl resin, 40 parts of nitrile rubber, said nitrile rubber being formed of 40% to 75% of butadiene 1,3 and correspondingly 60% to 25% of acrylonitrile, and an antiblocking agent consisting of 2.5 parts of stearone, the proportions being by weight.

16. Film substantially free of the tendency to block and formed of the composition comprising 60 parts polyvinyl chloride, 40 parts of nitrile rubber formed of 30% to 45% acrylonitrile and correspondingly 70% to 55% of butadiene 1,3 and an antiblocking agent consisting of 2½ parts of stearone, the proportions being by weight, said composition being free of volatile solvents.

RALPH J. SIGNER.

References Cited in the file of this patent

UNITED STATES PATENTS

| Number | Name | Date |
|---|---|---|
| 2,098,537 | Charch | Nov. 9, 1937 |
| 2,445,727 | Kinzinger | July 20, 1948 |